(12) United States Patent
Park et al.

(10) Patent No.: US 12,385,674 B2
(45) Date of Patent: Aug. 12, 2025

(54) HYDROGEN COMPRESSION SYSTEM

(71) Applicants: HYUNDAI MOTOR COMPANY, Seoul (KR); KIA CORPORATION, Seoul (KR); GRZ TECHNOLOGIES SA, Grolley (CH)

(72) Inventors: Ji Hye Park, Seoul (KR); Kyung Moon Lee, Uiwang-si (KR); Dong Hoon Nam, Suwon-si (KR); Young Jin Cho, Gimhae-si (KR); Hoon Mo Park, Seongnam-si (KR); Byeong Soo Shin, Uiwang-si (KR); Krzysztof Romanowicz, Fribourg (CH); Claudio Ruch, Baar (CH); Noris Gallandat, Schwarzsee (CH)

(73) Assignees: HYUNDAI MOTOR COMPANY, Seoul (KR); KIA CORPORATION, Seoul (KR); GRZ TECHNOLOGIES SA, Grolley (CH)

( * ) Notice: Subject to any disclaimer, the term of this patent is extended or adjusted under 35 U.S.C. 154(b) by 145 days.

(21) Appl. No.: 18/213,318

(22) Filed: Jun. 23, 2023

(65) Prior Publication Data
US 2024/0151436 A1 May 9, 2024

(30) Foreign Application Priority Data
Nov. 9, 2022 (KR) .................. 10-2022-0148796

(51) Int. Cl.
*F25B 41/20* (2021.01)
*F25B 1/10* (2006.01)
*F25B 41/42* (2021.01)

(52) U.S. Cl.
CPC ............... *F25B 1/10* (2013.01); *F25B 41/20* (2021.01); *F25B 41/42* (2021.01);
(Continued)

(58) Field of Classification Search
CPC .. F25B 1/10; F25B 41/20; F25B 41/42; F25B 2400/01; F25B 2400/0401; F25B 2400/075; C01B 3/0005; C01B 3/0026
See application file for complete search history.

(56) References Cited

U.S. PATENT DOCUMENTS 4,108,605 A * 8/1978 Billings ............... C01B 3/0005
                                                   422/223
4,995,235 A   2/1991 Halene
(Continued)

FOREIGN PATENT DOCUMENTS

JP        H01305273 A     12/1989

OTHER PUBLICATIONS

European Search Report cited in European patent application No. 23179161.7; Apr. 15, 2024; 6 pp.

*Primary Examiner* — Miguel A Diaz
(74) *Attorney, Agent, or Firm* — Lempia Summerfield Katz LLC (57) ABSTRACT

A hydrogen compression system includes: a heat pump part including a heat pump line configured to allow a refrigerant to circulate therethrough, a hydrogen compression part configured to compress hydrogen by being repeatedly heated and cooled, a first circulation line connected to the heat pump line while passing through the hydrogen compression part and configured to allow the refrigerant introduced from the heat pump line to circulate therethrough, a second circulation line provided to pass through the hydrogen compression part and configured to allow a cooling fluid to circulate therethrough, and a cooling unit provided in the second circulation line and configured to cool the cooling fluid, in which the hydrogen compression part is heated by the refrigerant or cooled by the cooling fluid, thereby minimizing electric power consumption and improving energy efficiency.

8 Claims, 3 Drawing Sheets

(52) U.S. Cl.
CPC ... *F25B 2400/01* (2013.01); *F25B 2400/0401* (2013.01); *F25B 2400/075* (2013.01)

(56) References Cited

U.S. PATENT DOCUMENTS

| | | | |
|---|---|---|---|
| 2008/0063902 A1* | 3/2008 | Kawasaki | H01M 8/04358 |
| | | | 429/10 |
| 2012/0198884 A1 | 8/2012 | Golben | |
| 2021/0396429 A1 | 12/2021 | Bahar | |
| 2025/0035366 A1* | 1/2025 | Zha | F25B 1/10 |

\* cited by examiner

HYDROGEN COMPRESSION SYSTEM

CROSS-REFERENCE TO RELATED APPLICATION

This application claims priority to and the benefit of Korean Patent Application No. 10-2022-0148796, filed in the Korean Intellectual Property Office on Nov. 9, 2022, the entire contents of which are incorporated herein by reference.

TECHNICAL FIELD

Embodiments of the present disclosure relate to a hydrogen compression system, and more particularly, to a hydrogen compression system capable of minimizing electric power consumption and improving energy efficiency when compressing hydrogen by using a thermochemical method.

BACKGROUND

The statements in this section merely provide background information related to the present disclosure and may not constitute prior art.

Hydrogen may be produced by hydrogen production facilities using steam reforming, water electrolysis, coal gasification, biomass gasification, and other fossil fuel-based methods such as a thermochemical process.

Meanwhile, because hydrogen extracted (produced) in the hydrogen production facility has a low pressure (e.g., 10 bar or less), it is difficult to store the hydrogen directly in a high-pressure storage facility such as a high-pressure tank. Therefore, hydrogen extracted (produced) in the hydrogen production facility needs to be compressed by a separate compression facility.

Examples of a method of compressing hydrogen include a method of compressing hydrogen in a mechanical manner and a method of compressing hydrogen in a non-mechanical manner. In the related art, there has been a proposed facility for compressing hydrogen without the use of mechanical means. This facility utilizes a thermochemical compressor based on metal hydride (namely, a metal hydride-based thermochemical compressor") to compress the hydrogen.

Unlike a mechanical compressor (e.g., a reciprocating compressor), the thermochemical compressor may compress hydrogen without a separate mechanical component (e.g., a piston configured to reciprocate). Therefore, it is possible to simplify the structure of the compressor and improve a degree of design freedom and spatial utilization. Further, the thermochemical compressor may cause less noise and be easily maintained and repaired because the cycle for replacing various types of components abraded by rotating devices is long. In addition, the mechanical compressor often contaminates hydrogen because the mechanical compressor uses lubricating oil. In contrast, the thermochemical hydrogen compressor releases hydrogen by breaking chemical bonds in the form of metal hydride without the use of lubricating oil, which makes it possible to maintain high-purity hydrogen.

The thermochemical compressor may compress hydrogen through a process of repeatedly heating and cooling a metal hydride material by using characteristics of the metal hydride material. An equilibrium pressure of a reaction for making metal hydride by storing hydrogen in metal varies depending on the composition and temperature of the material. In general, the equilibrium pressure increases as the temperature increases. Therefore, when hydrogen, which is introduced at a low temperature and a low pressure, forms metal hydride, the temperature is increased and then hydrogen is compressed through a process in which high-pressure hydrogen is released from metal hydride. As described above, to compress hydrogen by heating a metal hydride material, a separate electric heat source (e.g., an electric heater) needs to be provided, and the metal hydride material needs to be heated by heat transferred from the electric heat source to the metal hydride material by conduction. For this reason, there is a problem in that electric power consumption increases and energy efficiency decreases.

SUMMARY

The present disclosure has been made in an effort to provide a hydrogen compression system capable of minimizing electric power consumption and improving energy efficiency when compressing hydrogen by using a thermochemical method.

Particularly, the present disclosure has been made in an effort to operate a metal hydride compressor by using a refrigerant of a heat pump part as a heat source.

The present disclosure has also been made in an effort to continuously extract high-pressure hydrogen.

The objects to be achieved by the embodiments are not limited to the above-mentioned objects, but also include objects or effects that may be understood from the solutions or embodiments described below.

An embodiment of the present disclosure provides a hydrogen compression system. The hydrogen compression system includes: a heat pump part including a heat pump line configured to allow a refrigerant to circulate therethrough; a hydrogen compression part configured to compress hydrogen by being repeatedly heated and cooled; and a first circulation line connected to the heat pump line while passing through the hydrogen compression part and configured to allow the refrigerant introduced from the heat pump line to circulate therethrough. The hydrogen compression system further includes: a second circulation line provided to pass through the hydrogen compression part and configured to allow a cooling fluid to circulate therethrough; and a cooling unit provided in the second circulation line and configured to cool the cooling fluid, in which the hydrogen compression part is heated by the refrigerant or cooled by the cooling fluid.

This is to minimize electric power consumption required for a process of compressing hydrogen by using a thermochemical method and to improve energy efficiency.

In the related art, to compress hydrogen by using the thermochemical method, a separate electric heat source (e.g., an electric heater) for heating the metal hydride material needs to be provided, and the metal hydride material needs to be heated by heat transferred from the electric heat source to the metal hydride material by conduction. For this reason, there is a problem in that electric power consumption increases and energy efficiency decreases.

In contrast, according to the embodiment of the present disclosure, the hydrogen compression part configured to compress hydrogen by using a thermochemical method may be heated or cooled by the refrigerant and the cooling fluid of the heat pump part, such that the hydrogen compression part may be operated (heated and cooled) to compress hydrogen even without using a separate electric heat source (e.g., an electric heater) that consumes a large amount of electric power. Therefore, it is possible to obtain an advantageous effect of minimizing electric power consumption and remarkably improving energy efficiency (for example, by 50%) in comparison with a method that heats a hydrogen compression part by using an electric heat source.

The heat pump part may have various structures capable of converting thermal energy of a low-temperature object (e.g., the refrigerant) into high-temperature thermal energy by supplying mechanical energy from the outside.

According to an embodiment of the present disclosure, the heat pump part may include: a compressor provided in the heat pump line and configured to compress the refrigerant; a condenser provided in the heat pump line and configured to condense the refrigerant; an expansion valve provided in the heat pump line and configured to decompress the refrigerant; and an evaporator provided in the heat pump line and configured to vaporize the refrigerant, and the first circulation line may be connected to the condenser or the evaporator.

According to an embodiment of the present disclosure, the hydrogen compression part may include a first compression part configured to compress hydrogen, and a second compression part configured to compress hydrogen independently of the first compression part. The first and second compression parts may alternately compress hydrogen by being alternately heated or cooled.

As described above, the first and second compression parts may alternately compress hydrogen as the first and second compression parts are alternately heated or cooled. Therefore, it is possible to continuously perform the process of compressing hydrogen without interruption.

According to another embodiment of the present disclosure, the hydrogen compression system may include: a first bypass line having one end disposed at an upstream side of the first compression part and connected to the first circulation line, and the other end disposed at an upstream side of the second compression part and connected to the second circulation line. The hydrogen compression system may further include: a second bypass line having one end disposed at a downstream side of the second compression part and connected to the second circulation line, and the other end disposed at a downstream side of the first compression part and connected to the first circulation line. The hydrogen compression system may further include: a third bypass line having one end disposed at the upstream side of the second compression part and connected to the second circulation line, and the other end disposed at the upstream side of the first compression part and connected to the first circulation line. The hydrogen compression system may further include: a fourth bypass line having one end disposed at the downstream side of the first compression part and connected to the first circulation line, and the other end disposed at the downstream side of the second compression part and connected to the second circulation line.

According to an embodiment of the present disclosure, the hydrogen compression system may include: a first valve provided in the first circulation line and configured to selectively switch a flow path of the refrigerant introduced from the heat pump line to the first bypass line; and a second valve provided in the second circulation line and configured to selectively switch a flow path of the refrigerant having passed through the second compression part to the second bypass line. The hydrogen compression system may further include: a third valve provided in the second circulation line and configured selectively switch a flow path of the cooling fluid having passed through the cooling unit to the third bypass line; and a fourth valve provided in the first circulation line and configured to selectively switch a flow path of the cooling fluid having passed through the first compression part to the fourth bypass line.

According to an embodiment of the present disclosure, the first compression part may include a first-first metal hydride compressor configured to compress hydrogen, and a first-second metal hydride compressor configured to compress hydrogen independently of the first-first metal hydride compressor.

According to another embodiment of the present disclosure, the first-first metal hydride compressor and the first-second metal hydride compressor may be connected in series.

According to one embodiment of the present disclosure, the second compression part may include a second-first metal hydride compressor configured to compress hydrogen, and a second-second metal hydride compressor configured to compress hydrogen independently of the second-first metal hydride compressor.

According to one embodiment of the present disclosure, the second-first metal hydride compressor and the second-second metal hydride compressor may be connected in series.

According to one embodiment of the present disclosure, the hydrogen compression system may include: a first heater provided in the first circulation line, positioned between the first valve and the first compression part, and configured to heat the refrigerant; and a second heater provided in the second circulation line, positioned between the third valve and the second compression part, and configured to heat the refrigerant.

As described above, in the embodiment of the present disclosure, the first and second heaters may be respectively provided in the first and second circulation lines, and the first and second heaters may additionally heat the refrigerant to be supplied to the first and second compression parts at the time of heating the first and second compression parts. Therefore, it is possible to obtain an advantageous effect of increasing the heating capacity and heating speed of the first and second compression parts.

The drawings described herein are for illustration purposes only and are not intended to limit the scope of the present disclosure in any way.

DETAILED DESCRIPTION

Hereinafter, embodiments of the present disclosure are described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween. When a component, device, element, or the like of the present disclosure is described as having a purpose or performing an operation, function, or the like, the component, device, or element should be considered herein as being "configured to" meet that purpose or to perform that operation or function.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Figure 1:
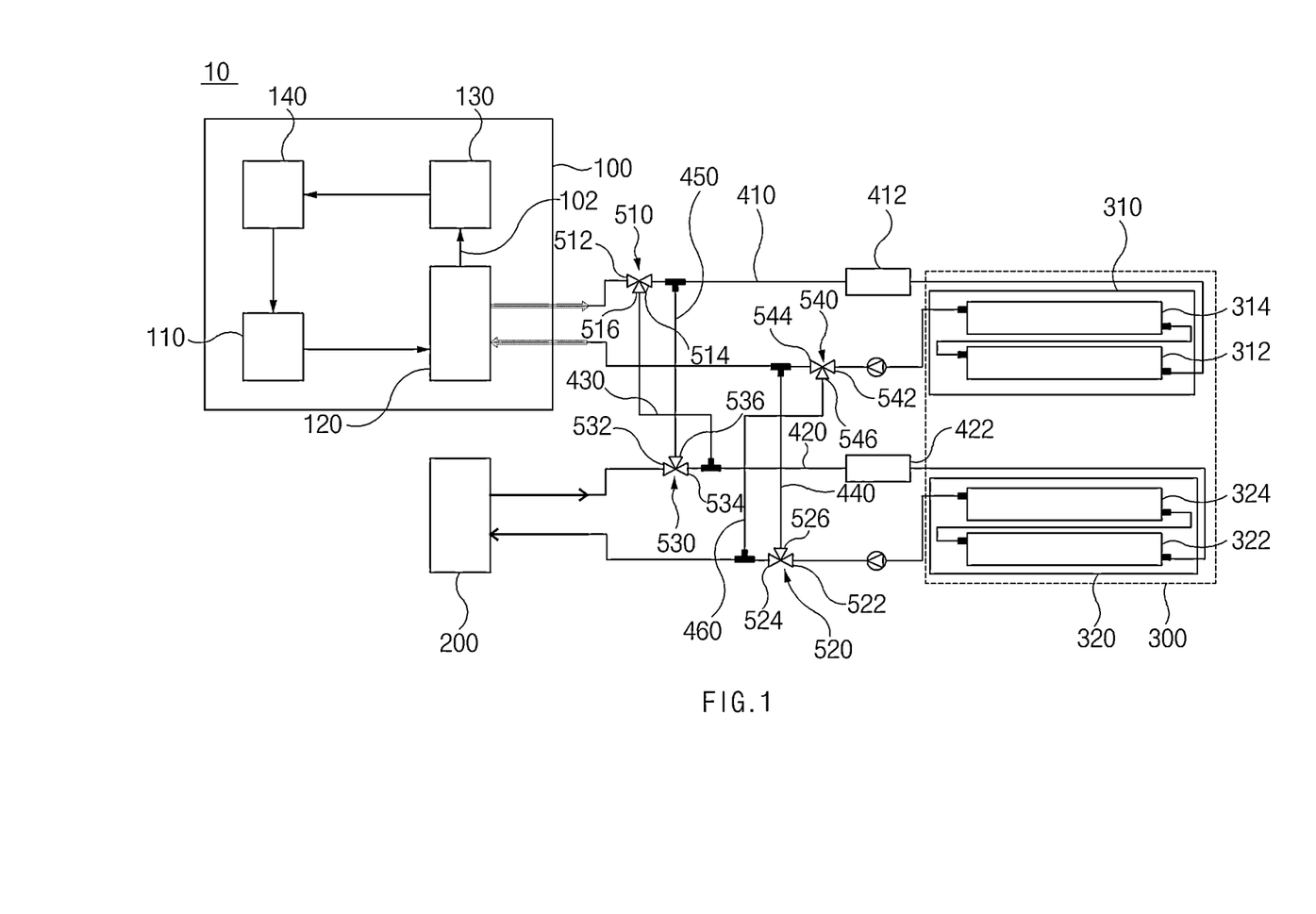
FIG. 1 is a view illustrating a hydrogen compression system according to an embodiment of the present disclosure.
Figure 2:
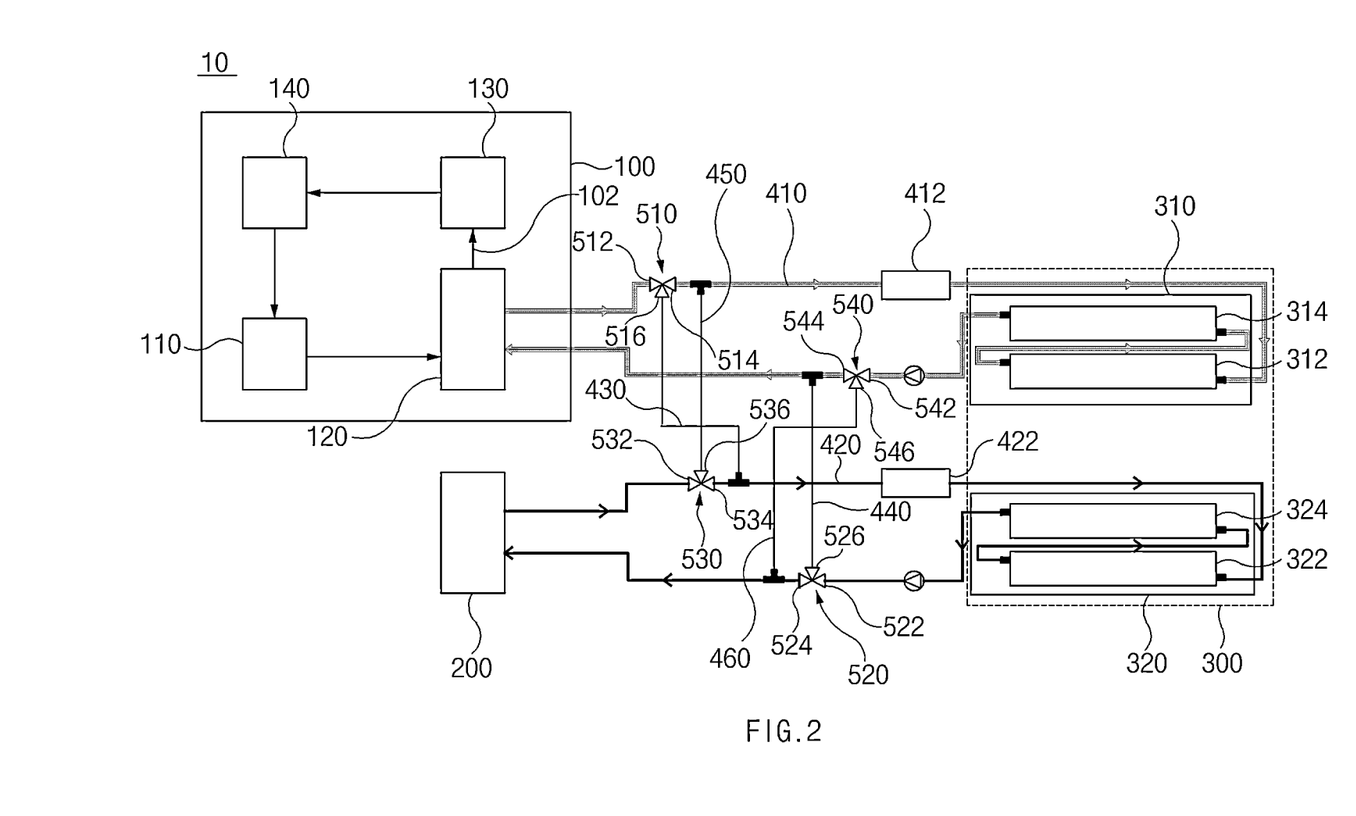
FIG. 2 is a view illustrating a process of heating a first compression part, and a process of cooling a second compression part of the hydrogen compression system according to an embodiment of the present disclosure.
Figure 3:
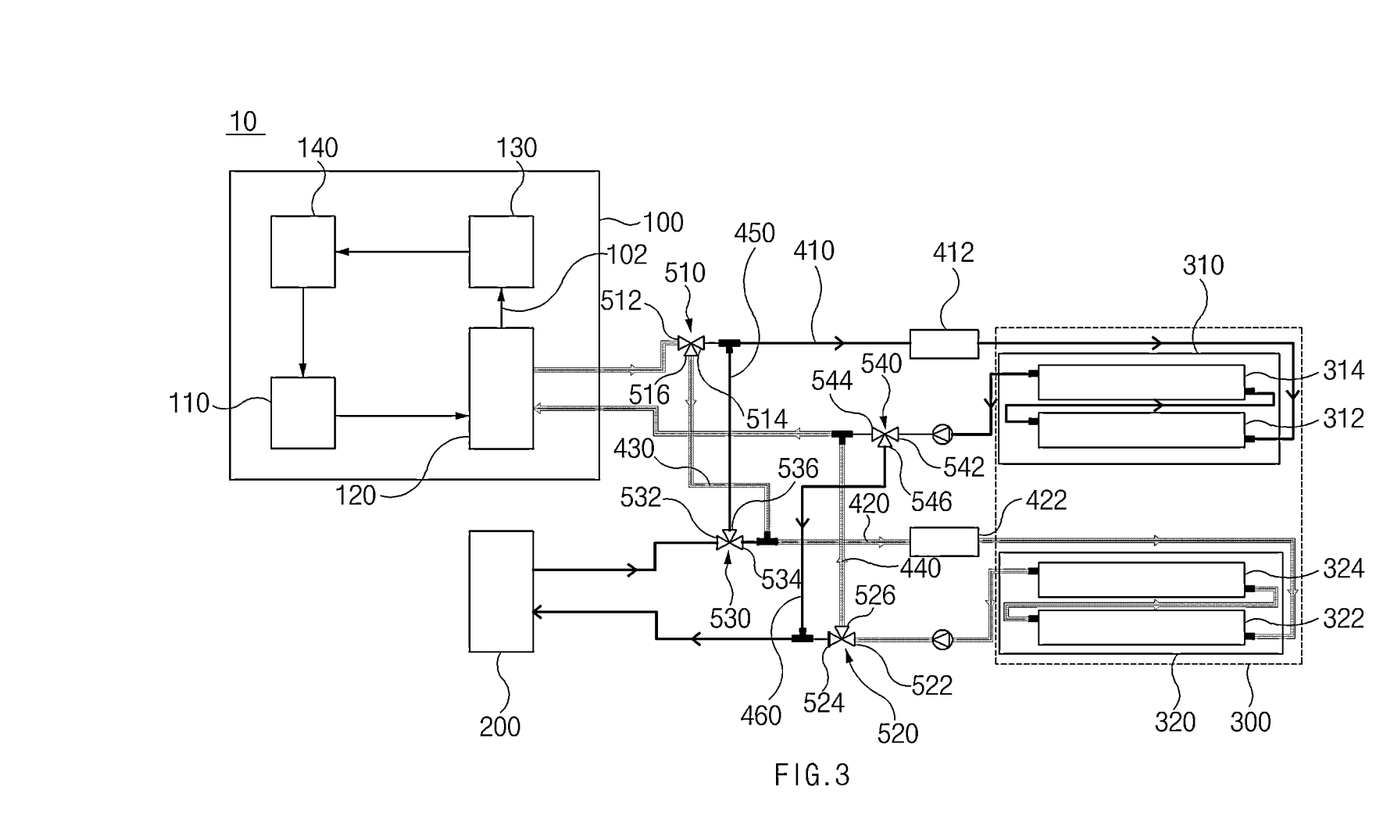
FIG. 3 is a view illustrating a process of cooling the first compression part, and a process of heating the second compression part of the hydrogen compression system according to an embodiment of the present disclosure.

Referring to FIGS. 1 to 3, a hydrogen compression system 10 according to an embodiment of the present disclosure includes: a heat pump part 100 including a heat pump line 102 and configured to allow a refrigerant to circulate therethrough; a hydrogen compression part 300 configured to compress hydrogen by being repeatedly heated and cooled; a first circulation line 410 connected to the heat pump line 102 while passing through the hydrogen compression part 300 and configured to allow the refrigerant introduced from the heat pump line 102 to circulate therethrough; a second circulation line 420 configured to pass through the hydrogen compression part 300 and allow a cooling fluid to circulate therethrough; and a cooling unit provided in the second circulation line 420 and configured to cool the cooling fluid. The hydrogen compression part 300 may be heated by the refrigerant or cooled by the cooling fluid.

For reference, the hydrogen compression system 10 according to the present disclosure may be used to treat (compress) required hydrogen. The present disclosure is not restricted or limited by the characteristics and states of hydrogen treated by the hydrogen compression system 10.

According to the embodiment of the present disclosure, the hydrogen compression system 10 may be used to compress hydrogen, produced by a steam reforming method (or water electrolysis), before the hydrogen is supplied to a supply destination (e.g., a high-pressure tank). According to another embodiment of the present disclosure, the hydrogen compression system may be used to compress again hydrogen that has been compressed once.

The heat pump part 100 may include the heat pump line 102 through which the refrigerant circulates. The refrigerant circulating through the heat pump line 102 may be used as a heat medium for heating the hydrogen compression part 300.

The heat pump part 100 may have various structures capable of converting thermal energy of a low-temperature object (e.g., the refrigerant) into high-temperature thermal energy by supplying mechanical energy from the outside. The present disclosure is not restricted or limited by the type and structure of the heat pump part 100.

According to the embodiment of the present disclosure, the heat pump part 100 may include: a compressor 110 provided in the heat pump line 102 and configured to compress the refrigerant; a condenser 120 provided in the heat pump line 102 and configured to condense the refrigerant; an expansion valve 130 provided in the heat pump line 102 and configured to decompress the refrigerant; and an evaporator 140 provided in the heat pump line 102 and configured to vaporize the refrigerant.

For example, the refrigerant may circulate through the heat pump line 102 while sequentially passing through the compressor 110, the condenser 120, the expansion valve 130, and the evaporator 140. According to another embodiment of the present disclosure, the refrigerant may circulate through the heat pump line while sequentially passing through the compressor, the evaporator, the expansion valve, and the condenser.

The compressor 110 is configured to compress the low-pressure refrigerant into the high-pressure refrigerant. The present disclosure is not restricted or limited by the type and structure of the compressor 110.

The condenser 120 is a kind of heat exchanger configured to condense the high-temperature, high-pressure refrigerant by exchanging heat with air (or water). The present disclosure is not restricted or limited by the type and structure of the condenser 120.

The expansion valve 130 is a kind of decompression valve configured to reduce a pressure of the refrigerant having passed through the condenser 120 and adjust a flow rate of the refrigerant. The present disclosure is not restricted or limited by the type and structure of the expansion valve 130.

The evaporator 140 is also a kind of heat exchanger configured to vaporize the refrigerant by exchanging heat with air (or water). The present disclosure is not restricted or limited by the type and structure of the evaporator 140.

The hydrogen compression part 300 is configured to compress hydrogen by being repeatedly heated and cooled.

The hydrogen compression part 300 may have various structures capable of compressing hydrogen by being repeatedly heated and cooled. The present disclosure is not restricted or limited by the structure of the hydrogen compression part 300.

For reference, in the embodiment of the present disclosure, the hydrogen compression part 300 may be defined as the hydrogen compression part 300 that does not include a separate electric heat source (e.g., an electric heater) for heating metal hydride compressors.

According to an embodiment of the present disclosure, the hydrogen compression part 300 may include a first compression part 310 configured to compress hydrogen, and a second compression part 320 configured to compress hydrogen independently of the first compression part 310. The first and second compression parts 310 and 320 may alternately compress hydrogen by being alternately heated or cooled.

According to another embodiment of the present disclosure, the hydrogen compression part may include three or more compression parts. Alternatively, the hydrogen compression part may include only one compression part.

According to another embodiment of the present disclosure, the first compression part 310 may include a first-first metal hydride compressor 312 configured to compress hydrogen, and a first-second metal hydride compressor 314 configured to compress hydrogen independently of the first-first metal hydride compressor 312.

In one form, the first-first metal hydride compressor 312 and the first-second metal hydride compressor 314 may be connected in series. For example, the first-second metal hydride compressor 314 may be connected in series to a downstream side of the first-first metal hydride compressor 312.

According to another embodiment of the present disclosure, the first-first metal hydride compressor and the first-second metal hydride compressor may be connected in parallel.

In addition, according to an embodiment of the present disclosure, the second compression part 320 may include a second-first metal hydride compressor 322 configured to compress hydrogen, and a second-second metal hydride compressor 324 configured to compress hydrogen independently of the second-first metal hydride compressor 322.

In one form, the second-first metal hydride compressor 322 and the second-second metal hydride compressor 324 may be connected in series. For example, the second-second metal hydride compressor 324 may be connected in series to a downstream side of the second-first metal hydride compressor 322.

According to another embodiment of the present disclosure, the second-first metal hydride compressor and the second-second metal hydride compressor may be connected in parallel.

Each of the metal hydride compressors (the first-first metal hydride compressor 312, the first-second metal hydride compressor 314, the second-first metal hydride compressor 322, and the second-second metal hydride compressor 324), which constitute the hydrogen compression part 300, is a metal hydride-based thermochemical compressor and may compress hydrogen by being repeatedly heated and cooled by using properties of a metal hydride material.

For example, the metal hydride compressors (the first-first metal hydride compressor 312, the first-second metal hydride compressor 314, the second-first metal hydride compressor 322, and the second-second metal hydride compressor 324) of the hydrogen compression part 300 may have various structures and shapes each having a storage space therein. The present disclosure is not restricted or limited by the structure and shape of the metal hydride compressor.

The type of metal hydride material, which constitutes each of the metal hydride compressors (the first-first metal hydride compressor 312, the first-second metal hydride compressor 314, the second-first metal hydride compressor 322, and the second-second metal hydride compressor 324) of the hydrogen compression part 300 may be variously changed in accordance with required conditions and design specifications.

For example, the metal hydride material may include at least one of an AB5-based alloy, an AB2-based alloy, or an AB-based alloy. For example, the metal hydride material may be an alloy containing $LaNi_5$, $TiFe$, $TiMn_2$, and the like as main elements.

For reference, the metal hydride material may be provided in the form of powder or pellets and accommodated in a container (not illustrated). The present disclosure is not restricted or limited by the accommodated state and shape of the metal hydride material. According to another embodiment of the present disclosure, the metal hydride material may be formed by compressing metal hydride powder or metal hydride pellets and have a bulk shape corresponding to the container.

The first circulation line 410 may be connected to the heat pump line 102 while passing through the hydrogen compression part 300. The refrigerant introduced from the heat pump line 102 may circulate through the first circulation line 410.

For example, the first circulation line 410 may be connected to the condenser 120 or the evaporator 140 through which the high-temperature refrigerant may flow.

In one embodiment, both ends (e.g., first and second ends) of the first circulation line 410 are connected to the condenser 120. With the above-mentioned structure, the high-temperature refrigerant discharged from the compressor 110 may circulate through the first circulation line 410 via the condenser 120 and then circulate through the heat pump line 102 via the condenser 120.

For reference, in the embodiment of the present disclosure, the configuration in which the first circulation line 410 passes through the hydrogen compression part 300 may mean that the first circulation line 410 is provided to exchange heat with (to heat) the metal hydride compressors (the first-first metal hydride compressor 312, the first-second metal hydride compressor 314, the second-first metal hydride compressor 322, and the second-second metal hydride compressor 324) that constitute the hydrogen compression part 300.

For example, the first circulation line 410 may pass through interiors of the metal hydride compressors (the first-first metal hydride compressor 312, the first-second metal hydride compressor 314, the second-first metal hydride compressor 322, and the second-second metal hydride compressor 324) or surround the metal hydride compressors.

According to the embodiment of the present disclosure, the refrigerant supplied through the first circulation line 410 may heat the metal hydride compressors (the first-first metal hydride compressor 312, the first-second metal hydride compressor 314, the second-first metal hydride compressor 322, and the second-second metal hydride compressor 324) through heat exchange by convection.

The refrigerant circulating through the first circulation line 410 may be used as a heat medium for heating the metal hydride compressors (the first-first metal hydride compressor 312, the first-second metal hydride compressor 314, the second-first metal hydride compressor 322, and the second-second metal hydride compressor 324).

The second circulation line 420 may pass through the hydrogen compression part 300, and the cooling fluid may circulate through the second circulation line 420.

The second circulation line 420 may have various structures capable of passing through the hydrogen compression part 300. The present disclosure is not restricted or limited by the structure and shape of the second circulation line 420.

In the embodiment of the present disclosure, the configuration in which the second circulation line 420 passes through the hydrogen compression part 300 may mean that the second circulation line 420 is provided to exchange heat with (to cool) the metal hydride compressors (the first-first metal hydride compressor 312, the first-second metal hydride compressor 314, the second-first metal hydride compressor 322, and the second-second metal hydride compressor 324) that constitute the hydrogen compression part 300.

For example, the second circulation line 420 may pass through the interiors of the metal hydride compressors (the first-first metal hydride compressor 312, the first-second metal hydride compressor 314, the second-first metal hydride compressor 322, and the second-second metal hydride compressor 324) or surround the metal hydride compressors.

According to the embodiment of the present disclosure, the cooling fluid supplied through the second circulation line 420 may cool the metal hydride compressors (the first-first metal hydride compressor 312, the first-second metal hydride compressor 314, the second-first metal hydride compressor 322, and the second-second metal hydride compressor 324) through heat exchange by convection.

The cooling fluid circulating through the second circulation line 420 may be used to cool the metal hydride compressors (the first-first metal hydride compressor 312, the first-second metal hydride compressor 314, the second-first metal hydride compressor 322, and the second-second metal hydride compressor 324).

For reference, a typical liquid (e.g., coolant) or gas may be used as the cooling fluid. The present disclosure is not restricted or limited by the type and properties of the cooling fluid.

The cooling unit is provided in the second circulation line 420 and configured to cool the cooling fluid.

Various cooling means capable of cooling the cooling fluid may be used as the cooling unit. The present disclosure is not restricted or limited by the type and structure (method) of the cooling unit.

For example, the cooling unit may be configured to cool the cooling fluid in a water-cooled manner (or air-cooled manner). According to another embodiment of the present disclosure, the cooling unit may be configured by using a Peltier element or other cooling means.

As described above, according to the embodiment of the present disclosure, the first and second compression parts 310 and 320 are configured to alternately compress hydrogen by being alternately heated or cooled.

For example, the second compression part 320 may be cooled while the first compression part 310 is heated (hydrogen is compressed). On the contrary, the first compression part 310 may be cooled while the second compression part 320 is heated (hydrogen is compressed).

As described above, the first and second compression parts 310 and 320 may alternately compress hydrogen as the first and second compression parts 310 and 320 are alternately heated or cooled. Therefore, it is possible to continuously perform the process of compressing hydrogen without interruption.

In one embodiment for alternately heating and cooling the first and second compression parts 310 and 320, the hydrogen compression system 10 may include: a first bypass line 430 having one end disposed at an upstream side of the first compression part 310 and connected to the first circulation line 410, and the other end disposed at an upstream side of the second compression part 320 and connected to the second circulation line 420; and a second bypass line 440 having one end disposed at a downstream side of the second compression part 320 and connected to the second circulation line 420, and the other end disposed at a downstream side of the first compression part 310 and connected to the first circulation line 410. The hydrogen compression system 10 may further include a third bypass line 450 having one end disposed at the upstream side of the second compression part 320 and connected to the second circulation line 420, and the other end disposed at the upstream side of the first compression part 310 and connected to the first circulation line 410; and a fourth bypass line 460 having one end disposed at the downstream side of the first compression part 310 and connected to the first circulation line 410, and the other end disposed at the downstream side of the second compression part 320 and connected to the second circulation line 420.

The first bypass line 430 is configured to supply the second circulation line 420 (the second compression part) with the refrigerant (the high-temperature refrigerant) that circulates through the first circulation line 410.

For example, one end of the first bypass line 430 may be disposed at the upstream side of the first compression part 310 (e.g., between the condenser 120 and an inlet end of the first compression part 310) and connected to the first circulation line 410. The other end of the first bypass line 430 may be disposed at the upstream side of the second compression part 320 (e.g., between the cooling unit and an inlet end of the second compression part 320) and connected to the second circulation line 420.

The second bypass line 440 is configured to return the refrigerant having passed through the second compression part 320 to the first circulation line 410 (the heat pump line).

For example, one end of the second bypass line 440 may be disposed at the downstream side of the second compression part 320 (e.g., between an outlet end of the second compression part 320 and the cooling unit) and connected to the second circulation line 420. The other end of the second bypass line 440 may be disposed at the downstream side of the first compression part 310 (e.g., between an outlet end of the first compression part 310 and the condenser 120) and connected to the first circulation line 410.

The third bypass line 450 is configured to supply the first circulation line 410 (the first compression part) with the cooling fluid that circulates through the second circulation line 420.

For example, one end of the third bypass line 450 may be disposed at the upstream side of the second compression part 320 (e.g., between the cooling unit and the inlet end of the second compression part 320) and connected to the second circulation line 420. The other end of the third bypass line 450 may be disposed at the upstream side of the first compression part 310 (e.g., between the condenser 120 and the inlet end of the first compression part 310) and connected to the first circulation line 410.

The fourth bypass line 460 is configured to return the refrigerant having passed through the first compression part 310 to the second circulation line 420 (the cooling unit).

For example, one end of the fourth bypass line 460 may be disposed at the downstream side of the first compression part 310 (e.g., between the outlet end of the first compression part 310 and the condenser 120) and connected to the first circulation line 410. The other end of the fourth bypass line 460 may be disposed at the downstream side of the second compression part 320 (e.g., between the outlet end of the second compression part 320 and the cooling unit) and connected to the second circulation line 420.

According to another embodiment of the present disclosure, the hydrogen compression system 10 may include: a first valve 510 provided in the first circulation line 410 and configured to selectively switch the flow path of the refrigerant introduced from the heat pump line 102 to the first bypass line 430; and a second valve 520 provided in the second circulation line 420 and configured to selectively switch the flow path of the refrigerant having passed through the second compression part 320 to the second bypass line 440. The hydrogen compression system 10 may further include: a third valve 530 provided in the second circulation line 420 and configured to selectively switch the flow path of the cooling fluid having passed through the cooling unit to the third bypass line 450; and a fourth valve 540 provided in the first circulation line 410 and configured to selectively switch the flow path of the cooling fluid having passed through the first compression part 310 to the fourth bypass line 460.

The first valve 510 may be provided in the first circulation line 410 and positioned between the condenser 120 and the inlet end of the first compression part 310. The first bypass line 430 may be connected to the first valve 510.

Various valve means capable of selectively switching the flow path of the refrigerant introduced from the heat pump line 102 to the first bypass line 430 may be used as the first valve 510.

For example, a typical three-way valve may be used as the first valve 510. More specifically, the first valve 510 may include: a first-first port 512 connected to the first circulation line 410 so that the refrigerant introduced from the heat pump line 102 is introduced into the first valve 510; a first-second port 514 connected to the first circulation line 410 so that the refrigerant having passed through the first valve 510 is supplied to the first compression part 310; and a first-third port 516 connected to one end of the first bypass line 430.

It is possible to selectively switch the flow path of the refrigerant introduced from the heat pump line 102 to the first bypass line 430 by selectively opening or closing the first-first port 512, the first-second port 514, and the first-third port 516 of the first valve 510. In other words, referring to FIG. 2, at the time of heating the first compression part 310 (cooling the second compression part 320), when the first-first port 512 and the first-second port 514 are opened, and the first-third port 516 is closed, the refrigerant introduced from the heat pump line 102 may be supplied to the first compression part 310. In contrast, as illustrated in FIG. 3, at the time of heating the second compression part 320 (cooling the first compression part 310), when the first-first port 512 and the first-third port 516 are opened, and the first-second port 514 is closed, the supply of the refrigerant to the first compression part 310 may be cut off, and the refrigerant introduced from the heat pump line 102 may be supplied to the second compression part 320 through the first bypass line 430.

The second valve 520 may be provided in the second circulation line 420 and positioned between the outlet end of the second compression part 320 and the cooling unit. The second bypass line 440 may be connected to the second valve 520.

Various valve means capable of selectively switching the flow path of the refrigerant having passed through the second compression part 320 to the second bypass line 440 may be used as the second valve 520.

For example, a typical three-way valve may be used as the second valve 520. More specifically, the second valve 520 may include: a second-first port 522 connected to the second circulation line 420 so that the refrigerant having passed through the second compression part 320 is introduced into the second valve 520; a second-second port 524 connected to the second circulation line 420 so that the cooling fluid having passed through the second valve 520 is supplied to the cooling unit (the refrigerant having passed through the second compression part is not supplied to the cooling unit); and a second-third port 526 connected to one end of the second bypass line 440.

It is possible to selectively switch the flow path of the refrigerant having passed through the second compression part 320 to the second bypass line 440 by selectively opening or closing the second-first port 522, the second-second port 524, and the second-third port 526 of the second valve 520. In other words, referring to FIG. 2, at the time of heating the first compression part 310 (cooling the second compression part 320), when the second-first port 522 and the second-second port 524 are opened, and the second-third port 526 is closed, the cooling fluid having passed through the second compression part 320 may be supplied to the cooling unit. In contrast, as illustrated in FIG. 3, at the time of heating the second compression part 320 (cooling the first compression part 310), when the second-first port 522 and the second-third port 526 are opened, and the second-second port 524 is closed, the refrigerant having passed through the second compression part 320 may be supplied back to the first circulation line 410 (the heat pump line) through the second bypass line 440.

The third valve 530 may be provided in the second circulation line 420 and positioned between the cooling unit and the inlet end of the second compression part 320. The third bypass line 450 may be connected to the third valve 530.

Various valve means capable of selectively switching the flow path of the cooling fluid having passed through the cooling unit to the third bypass line 450 may be used as the third valve 530.

For example, a typical three-way valve may be used as the third valve 530. More specifically, the third valve 530 may include: a third-first port 532 connected to the second circulation line 420 so that the cooling fluid having passed through the cooling unit is introduced into the third valve 530; a third-second port 534 connected to the second circulation line 420 so that the cooling fluid having passed through the third valve 530 is supplied to the second compression part 320; and a third-third port 536 connected to one end of the second bypass line 440.

It is possible to selectively switch the flow path of the cooling fluid having passed through the cooling unit to the third bypass line 450 by selectively opening or closing the third-first port 532, the third-second port 534, and the third-third port 536 of the third valve 530. In other words, referring to FIG. 2, at the time of heating the first compression part 310 (cooling the second compression part 320), when the third-first port 532 and the third-second port 534 are opened, and the third-third port 536 is closed, the cooling fluid having passed through the cooling unit may be supplied to the second compression part 320. In contrast, as illustrated in FIG. 3, at the time of heating the second compression part 320 (cooling the first compression part 310), when the third-first port 532 and the third-third port 536 are opened, and the third-second port 534 is closed, the supply of the cooling fluid to the second compression part 320 may be cut off, and the cooling fluid having passed through the cooling unit may be supplied to the first compression part 310 through the third bypass line 450.

The fourth valve 540 may be provided in the first circulation line 410 and positioned between the outlet end of the first compression part 310 and the condenser 120. The fourth bypass line 460 may be connected to the fourth valve 540.

Various valve means capable of selectively switching the flow path of the cooling fluid having passed through the first compression part 310 to the fourth bypass line 460 may be used as the fourth valve 540.

For example, a typical three-way valve may be used as the fourth valve 540. More specifically, the fourth valve 540 may include: a fourth-first port 542 connected to the first circulation line 410 so that the cooling fluid having passed through the first compression part 310 is introduced into the fourth valve 540; a fourth-second port 544 connected to the first circulation line 410 so that the refrigerant having passed through the fourth valve 540 is supplied to the condenser 120 (the cooling fluid having passed through the first compression part is not supplied to the condenser); and a fourth-third port 546 connected to one end of the fourth bypass line 460.

It is possible to selectively switch the flow path of the cooling fluid having passed through the first compression part 310 to the fourth bypass line 460 by selectively opening or closing the fourth-first port 542, the fourth-second port 544, and the fourth-third port 546 of the fourth valve 540. In other words, referring to FIG. 2, at the time of heating the first compression part 310 (cooling the second compression part 320), when the fourth-first port 542 and the fourth-second port 544 are opened, and the fourth-third port 546 is closed, the refrigerant having passed through the first compression part 310 may be supplied to the cooling unit. In contrast, as illustrated in FIG. 3, at the time of heating the second compression part 320 (cooling the first compression part 310), when the fourth-first port 542 and the fourth-third port 546 are opened, and the fourth-second port 544 is closed, the cooling fluid having passed through the first compression part 310 may be supplied back to the second circulation line 420 (the cooling unit) through the fourth bypass line 460.

With the above-mentioned structure, the first and second compression parts 310 and 320 may continuously perform the process of compressing hydrogen without interruption by being alternately heated or cooled.

Referring to FIG. 2, at the time of heating the first compression part 310, the refrigerant circulating through the first circulation line 410 may heat the first-first metal hydride compressor 312 and the first-second metal hydride compressor 314 by sequentially passing through the first-first metal hydride compressor 312 and the first-second metal hydride compressor 314.

In addition, as illustrated in FIG. 2, the second compression part 320 may be cooled while the first compression part 310 is heated. At the time of cooling the second compression part 320, the cooling fluid circulating through the second circulation line 420 may cool the second-first metal hydride compressor 322 and the second-second metal hydride compressor 324 by sequentially passing through the second-first metal hydride compressor 322 and the second-second metal hydride compressor 324.

In contrast, referring to FIG. 3, at the time of heating the second compression part 320, the refrigerant circulating through the first circulation line 410 may heat the second-first metal hydride compressor 322 and the second-second metal hydride compressor 324 by sequentially passing through the second-first metal hydride compressor 322 and the second-second metal hydride compressor 324 via the first bypass line 430. Thereafter, the refrigerant having passed through the second compression part 320 (the second-first metal hydride compressor 322 and the second-second metal hydride compressor 324) may be supplied back to the first circulation line 410 through the second bypass line 440.

In addition, as illustrated in FIG. 3, the first compression part 310 may be cooled while the second compression part 320 is heated. At the time of cooling the first compression part 310, the cooling fluid circulating through the second circulation line 420 may cool the first-first metal hydride compressor 312 and the first-second metal hydride compressor 314 by sequentially passing through the first-first metal hydride compressor 312 and the first-second metal hydride compressor 314 via the third bypass line 450. Thereafter, the cooling fluid having passed through the first compression part 310 (the first-first metal hydride compressor 312 and the first-second metal hydride compressor 314) may be supplied back to the second circulation line 420 through the fourth bypass line 460.

The embodiments of the present disclosure are illustrated and described above as the first and second compression parts 310 and 320 are alternately heated or cooled. However, according to another embodiment of the present disclosure, the first and second compression parts may be simultaneously heated or simultaneously cooled. According to the embodiment of the present disclosure, the hydrogen compression system 10 may include: a first heater 412 provided in the first circulation line 410, positioned between the first valve 510 and the first compression part 310, and configured to heat the refrigerant; and a second heater 422 provided in the second circulation line 420, positioned between the third valve 530 and the second compression part 320, and configured to heat the refrigerant.

The first heater 412 is configured to heat the refrigerant to be supplied to the first compression part 310 through the first circulation line 410.

Various heating means capable of heating the refrigerant to be supplied to the first compression part 310 through the first circulation line 410 may be used as the first heater 412. The present disclosure is not restricted or limited by the type and structure of the first heater 412. For example, a typical electric heater may be used as the first heater 412.

As described above, in the embodiment of the present disclosure, the first heater 412 may be provided in the first circulation line 410, and the first heater 412 may additionally heat the refrigerant to be supplied to the first compression part 310 at the time of heating the first compression part 310. Therefore, it is possible to obtain an advantageous effect of increasing the heating capacity and heating speed of the first compression part 310.

The second heater 422 is configured to heat the refrigerant to be supplied to second compression part 320 through the second circulation line 420 via the first bypass line 430.

Various heating means capable of heating the refrigerant to be supplied to the second compression part 320 through the second circulation line 420 may be used as the second heater 422. The present disclosure is not restricted or limited by the type and structure of the second heater 422. For example, a typical electric heater may be used as the second heater 422.

As described above, in the embodiment of the present disclosure, the second heater 422 may be provided in the second circulation line 420, and the second heater 422 may additionally heat the refrigerant to be supplied to the second compression part 320 at the time of heating the second compression part 320. Therefore, it is possible to obtain an advantageous effect of increasing the heating capacity and heating speed of the second compression part 320.

As described above, according to the embodiment of the present disclosure, it is possible to obtain an advantageous effect of minimizing electric power consumption and improving energy efficiency when compressing hydrogen by using the thermochemical method.

In particular, according to the embodiments of the present disclosure, it is possible to operate the metal hydride compressor by using the refrigerant of the heat pump part as a heat source. Therefore, it is possible to obtain an advantageous effect of minimizing electric power consumption required for the process of compressing hydrogen and an advantageous effect of improving energy efficiency.

In addition, according to the embodiments of the present disclosure, it is possible to obtain an advantageous effect of continuously extracting high-pressure hydrogen and reducing the time required for the process of compressing hydrogen.

While the embodiments have been described above, the embodiments are just illustrative and not intended to limit the present disclosure. It can be appreciated by those having ordinary skill in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure.

What is claimed is:

1. A hydrogen compression system comprising:
   a heat pump part comprising a heat pump line configured to allow a refrigerant to circulate therethrough;
   a hydrogen compression part configured to compress hydrogen by being repeatedly heated and cooled;
   a first circulation line connected to the heat pump line while passing through the hydrogen compression part and configured to allow the refrigerant introduced from the heat pump line to circulate therethrough;
   a second circulation line provided to pass through the hydrogen compression part and configured to allow a cooling fluid to circulate therethrough; and
   a cooling unit provided in the second circulation line and configured to cool the cooling fluid,
   wherein the hydrogen compression part is heated by the refrigerant or cooled by the cooling fluid,
   wherein the hydrogen compression part comprises:
      a first compression part configured to compress the hydrogen; and
      a second compression part configured to compress hydrogen independently of the first compression part, and
   wherein the first and second compression parts are alternately heated or cooled,
   wherein the hydrogen compression system further comprises:
   a first bypass line having a first end disposed at an upstream side of the first compression part and connected to the first circulation line, and a second end disposed at an upstream side of the second compression part and connected to the second circulation line;
   a second bypass line having a first end disposed at a downstream side of the second compression part and connected to the second circulation line, and a second end disposed at a downstream side of the first compression part and connected to the first circulation line;
   a third bypass line having a first end disposed at the upstream side of the second compression part and connected to the second circulation line, and a second end disposed at the upstream side of the first compression part and connected to the first circulation line; and
   a fourth bypass line having a first end disposed at the downstream side of the first compression part and connected to the first circulation line, and a second end disposed at the downstream side of the second compression part and connected to the second circulation line.

2. The hydrogen compression system of claim 1, wherein the first compression part comprises:
   a first-first metal hydride compressor configured to compress hydrogen; and
   a first-second metal hydride compressor configured to compress hydrogen independently of the first-first metal hydride compressor.

3. The hydrogen compression system of claim 2, wherein the first-first metal hydride compressor and the first-second metal hydride compressor are connected in series.

4. The hydrogen compression system of claim 1, wherein the second compression part comprises:
   a second-first metal hydride compressor configured to compress hydrogen; and
   a second-second metal hydride compressor configured to compress hydrogen independently of the second-first metal hydride compressor.

5. The hydrogen compression system of claim 4, wherein the second-first metal hydride compressor and the second-second metal hydride compressor are connected in series.

6. The hydrogen compression system of claim 1, comprising:
   a first valve provided in the first circulation line and configured to selectively switch a flow path of the refrigerant introduced from the heat pump line to the first bypass line;
   a second valve provided in the second circulation line and configured to selectively switch a flow path of the refrigerant having passed through the second compression part to the second bypass line;
   a third valve provided in the second circulation line and configured selectively switch a flow path of the cooling fluid having passed through the cooling unit to the third bypass line; and
   a fourth valve provided in the first circulation line and configured to selectively switch a flow path of the cooling fluid having passed through the first compression part to the fourth bypass line.

7. The hydrogen compression system of claim 6, comprising:
   a first heater provided in the first circulation line, positioned between the first valve and the first compression part, and configured to heat the refrigerant; and
   a second heater provided in the second circulation line, positioned between the third valve and the second compression part, and configured to heat the refrigerant.

8. The hydrogen compression system of claim 1, wherein the heat pump part comprises:
   a compressor provided in the heat pump line and configured to compress the refrigerant;
   a condenser provided in the heat pump line and configured to condense the refrigerant;

an expansion valve provided in the heat pump line and configured to decompress the refrigerant; and an evaporator provided in the heat pump line and configured to vaporize the refrigerant, and wherein the first circulation line is connected to the condenser or the evaporator.

* * * * *